Jan. 27, 1970     J. KRIZMAN, JR     3,491,891

FILTER DEVICE

Filed Sept. 25, 1967

JOHN KRIZMAN, JR.
INVENTOR.

BY *Geo. J. Posta Jr.*

ATTORNEY

United States Patent Office 3,491,891
Patented Jan. 27, 1970

3,491,891
FILTER DEVICE
John Krizman, Jr., 10549 Monogram Ave.,
Granada Hills, Calif. 91344
Filed Sept. 25, 1967, Ser. No. 680,269
Int. Cl. B01d 29/04
U.S. Cl. 210—483
2 Claims

ABSTRACT OF THE DISCLOSURE

A novel filter and a filtering device comprising a filter, a filter support screen, a cover and a base. The filter has a variable cross-sectional configuration and provides increased filtering capacity and a positive edge sealing means by virtue of the filter's configuration and its coaction with a novel support screen.

BACKGROUND OF THE INVENTION

The invention is directed to the art of filter devices and filter elements.

The prior art relating to the invention generally provides a flat filter element of uniform cross section which is carried by a flat support screen. Some of the prior art also includes filter edge abutment members, such as a base and cover, which serve to retain the filter in place. The prior art devices have failed to provide a positive sealing means between the filter and abutment members to insure a seal therebetween. Closed sections of the support screen in the prior art devices also resulted in a substantial decrease in filtering capacity of the filter device. Applicant's invention provides a ready solution to the foregoing problems in the prior art in a manner as hereinafter shall be set forth.

SUMMARY OF THE INVENTION

An object of this invention is to provide a filtering device having a greater filtration capacity than present filtering devices.

Another object of this invention is to provide a filter having a uniquely functional configuration.

A further object of this invention is to provide a filtering device providing a unique coaction between the filter, support screen, filter cover and base member such that a plurality of positive seals are created.

Yet another object of the invention is to provide a filtering device having a filter with cavities therein wherein a continuous flow is maintained through the filter despite the closing of sections of the support screen.

A still further object of the invention is to provide a filter as hereinabove set forth which is relatively easy to manufacture.

The invention generally comprises a filter made of a flexible material such as polyurethane foam and having an undulating cross-sectional configuration with a series of alternating ridges and channels on the inner and outer surfaces. A series of raised portions are located on the top of each inner ridge. The filter is adapted for use with a filtering device having a tubular support screen, a cover and a base. In one embodiment of the invention, the tubular support screen has an inwardly directed concave outer surface. In this embodiment of the invention, the filter element is placed so as to completely encircle the screen and provide for overlapping of the screen by a ridge and raised portion on the top and bottom of the screen, respectively. The filter cover is placed on top of the screen and filter and drawn toward the base, simultaneously compressing the overlapped parts of the filter between the support screen and cover and between the support screen and base to provide a plurality of positive sealing means between the cover and screen and the base and screen, thereby preventing leakage past the filter element. In this operative relationship, the filter surrounds the support screen but only a portion of the inner surface of the filter is in contact with the support screen. A plurality of channels is formed on the inner and outer surfaces of the filter thereby providing an effective filtering surface area significantly greater than the surface area of the filter. Since only a portion of the filter is in contact with the support screen, restriction of the flow of the filtered medium due to closing of segments of the screen is minimized since the filtered medium can readily bypass the closed area via the channels formed on the inner surface of the filter.

DESCRIPTION OF THE PREFERRED EMBODIMENT

Figure 1:
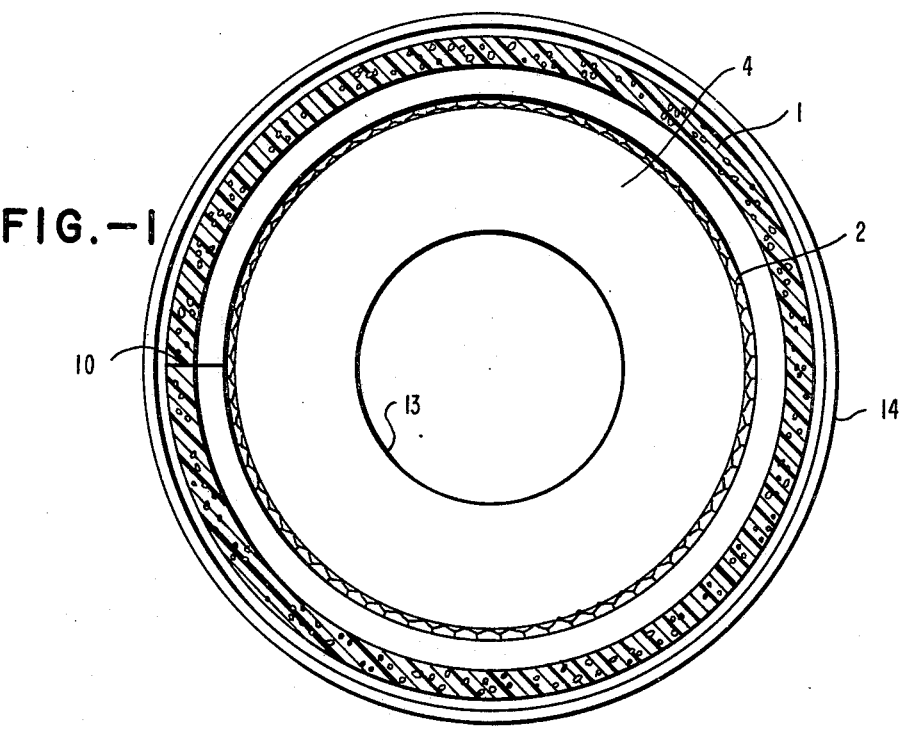
FIGURE 1 is a top sectional view of the filter device taken along line 1—1 of FIGURE 2.
Figure 2:
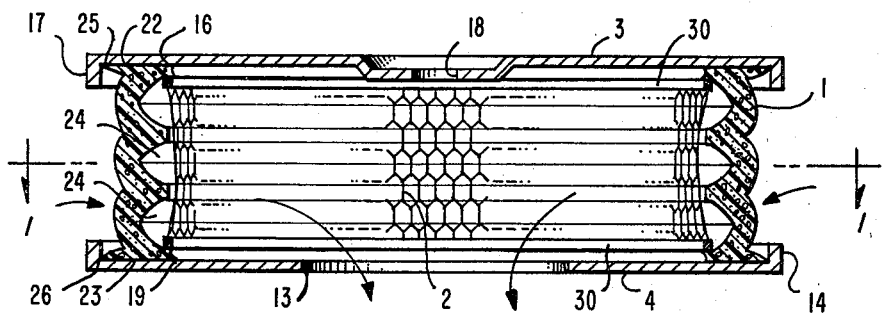
FIGURE 2 is a side elevation sectional view of the filter device in its operative position, with the filter element in a compressed state.
Figure 3:
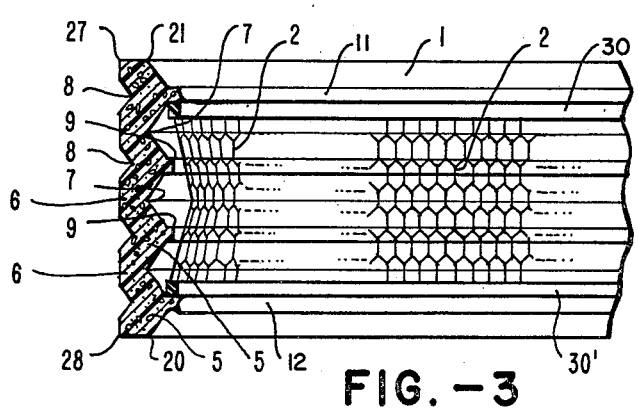
FIGURE 3 is a side elevation view of the filter element in its uncompressed state with the support screen superimposed thereon.

The invention is directed to a unique filtering element as shown in FIGURE 3 and to a unique filtering device such as is shown in FIGURES 1 and 2. The filtered medium is adapted to flow in the direction shown by the flow arrows in FIGURE 2. The filter element 1 can be made from any well known filter material such as polyurethane foam or other equivalent filter material. The primary requirement of the filter material are that it be flexible, porous and capable of filtering undesirable elements from the medium to be filtered. In the preferred embodiment, the filter is constructed so as to provide a series of ridges 5 and 6 on the inner and outer surfaces of the filter, respectively, and a series of channels or grooves 7 and 8 on the inner and outer surfaces of the filter, respectively. A series of raised portions 9 are provided on the top of each inner ridge 5 of the filter 1. The filter element 1, in its normal unflexed state, lies in a flat plane and has a cross-sectional area as is shown in FIGURE 3.

The inner channels 7 are in substantial alignment with outer ridges 6, and the inner ridges 5 are in substantial alignment with outer channels 8 to afford maximum strength and stability.

The support screen 2 can be fabricated from any rigid or semi-rigid screen material having a plurality of relatively large openings therein, such as perforated sheet metal. In the preferred embodiment of the invention, the support screen 2 has an inwardly directed concave surface, and molded rubber lips 30 and 30' on the upper and lower edges.

In the preferred embodiment of the filter device shown in FIGURE 2, a length of filter element is prepared such that the circumference of the circle formed by the inner ridges 5 and the raised portions 9 are substantially equivalent to the outer circumference of support screen 2. The height of the filter element is fabricated such that the distance between the uppermost raised portion 11 and lowermost raised portion 12 of the filter 1 in its uncompressed state is substantially equivalent to the height of the support screen 2. This filter element 1 is placed about the support screen 2 and joined at the ends 10 thereof by a suitable adhesive. The cavity formed by the concave outer surface of support screen 2 serves as a nest which accommodate the inner ridges 5 with raised portions 9 of filter element 1. The filter and support screen subassembly is then placed upon a base member 4 having an opening 13 therein and a raised retainer lip 14 located about the circumferences thereof, said base member and retainer lip serving as a nest for the filter-screen subassembly. The inner circumference of the retainer lip 14 is slightly larger than the outer circumference formed by the outer ridges 6 of filter 1. A cover member 3 having a retainer lip 17 is then placed over the filter and support screen assembly and drawn toward the base member 4 by suitable standard locking means. The inner circumference of retainer lip 17 is substantially the same as the inner circumference of retainer lip 14. The opening 18 in cover 16 is provided for the insertion of the locking means and would be closed during operation of the filter device.

FIGURE 2 shows the filter device in its operational state. It is readily apparent that the total operational filtering surface of the filter 1 is significantly greater than the total surface area of the filter screen, thereby enabling a significantly increased filtering capacity. Since the inner circumference of the raised ridges 9 is smaller than the outer circumference of the support screen 2, the inner raised ridges 9 are nested within the cavity formed by the outer surface of support screen 2 with the outer ridges 11 and 12 overlapping the support screen edges, thereby automatically providing a positive seal between the support screen 2 and cover member 3 and base member 4 as shown in FIGURE 2 at 16 and 19, respectively.

Because of the configuration of the filter element 1, it becomes apparent that a secondary positive seal is created by protrusions 20 and 21 of filter element 1. When in the operative position as shown in FIGURE 2, the protrusions 20 and 21 undergo a deformation which causes a pressure point to be created at points 22 and 23, thereby affording a secondary positive seal at these points.

A third positive seal is created at points 25 and 26 due to the outward deformation of protrusions 27 and 28 respectively of filter element 1.

In the event that a portion of the screen becomes closed, the closed portion will not obstruct the flow of the filtered medium, since the filtered medium can readily bypass such closed area by circulating via the formed cavities 24 which encircle the support screen.

It is apparent that applicant has invented a new and useful filter element and filter device incorporating same which provides advantages and functions heretofore unavailable in the prior art.

What is claimed and desired to be secured by United States Letters Patent is:

1. A filter assembly comprising:
a cylindrical filter element support screen having a perforated sidewall with upper and lower ends;
an annular filter element of flexible porous foam material having an undulating cross-sectional configuration with a series of alternating annular horizontal ridges and channels on the inner and outer surfaces thereof, the vertical height of said filter element exceeding that of said support screen and the inner circumference of the ridges on the inner surface of said filter element being smaller than the outer circumference of the support screen sidewall, said flexible filter element being mounted about said support screen with inner, uppermost and lowermost ridges of said element overlying the upper and lower ends of said support screen;
a rubber-like lip on each of the upper and lower ends of said support screen interposed between said support screen uppermost and lower ends and said filter element upper and lowermost inner ridges respectively; and
means for retaining said upper and lower inner ridges of said filter element in sealed relation to said rubber-like lips provided on said support screen.

2. A filter assembly comprising:
an annular filter element of flexible porous foam material having an undulating cross-section and a series of alternating annular horizontal ridges and channels formed in an inner surface thereof, said filter element having upper and lower end annular inwardly directed ridges;
a tubular support means having a perforated tubular sidewall about which said annular filter element is mounted with said annular ridges and channels facing said tubular support means and said upper and lower end annular inwardly directing ridges overlying upper and lower ends of said support means respectively;
top and bottom rubber-like end rings of resilient material interposed between said overlying filter element ridges and on said support means ends; and
means for retaining said upper and lower end annular inwardly directed ridges in sealed relation to said top and bottom end rings of resilient material with mid portions of said element being free to flex inwardly toward and outwardly away from said support means.

References Cited

UNITED STATES PATENTS

| | | | |
|---|---|---|---|
| 2,065,970 | 12/1936 | Hartzell | 55—482 |
| 2,966,960 | 1/1961 | Rochlin | 55—522 |
| 2,996,145 | 8/1961 | Thornburgh | 55—498 |
| 3,002,584 | 10/1961 | Jerabek et al. | 55—482 |
| 3,056,501 | 10/1962 | Thorman et al. | 210—493 |
| 3,058,593 | 10/1962 | Gruner | 210—493 |
| 3,169,844 | 2/1965 | Young | 55—510 |
| 3,281,513 | 10/1966 | Stripp et al. | 55—502 |
| 3,212,242 | 10/1965 | Florine | 55—510 |
| 3,352,423 | 11/1967 | Osterman | 210—496 |
| 3,365,864 | 1/1968 | Iizima | 55—522 |

FOREIGN PATENTS

| | | |
|---|---|---|
| 1,314,475 | 12/1962 | France. |
| 902,843 | 8/1962 | Great Britain. |
| 936,777 | 9/1963 | Great Britain. |

HARRY B. THORNTON, Primary Examiner

BERNARD NOZICK, Assistant Examiner

U.S. Cl. X.R.

55—502, 510, 522, 529; 210—510